US008725093B2

(12) United States Patent
Liu

(10) Patent No.: US 8,725,093 B2
(45) Date of Patent: May 13, 2014

(54) RADIO FREQUENCY TRANSMISSION DEVICE AND METHOD WITH MULTI-MODE AND FULL FREQUENCY BAND

(75) Inventor: Xin Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/634,129

(22) PCT Filed: Nov. 19, 2010

(86) PCT No.: PCT/CN2010/078916
§ 371 (c)(1),
(2), (4) Date: Sep. 11, 2012

(87) PCT Pub. No.: WO2011/127733
PCT Pub. Date: Oct. 20, 2011

(65) Prior Publication Data
US 2013/0040589 A1 Feb. 14, 2013

(30) Foreign Application Priority Data

Apr. 14, 2010 (CN) .......................... 2010 1 0148417

(51) Int. Cl.
H01Q 11/12 (2006.01)
H04B 1/04 (2006.01)
(52) U.S. Cl.
USPC .......................................... 455/124; 455/125
(58) Field of Classification Search
USPC ........................ 455/128–129, 124, 120, 125
See application file for complete search history.

(56) References Cited

U.S. PATENT DOCUMENTS

| 6,847,262 | B2* | 1/2005 | Ichitsubo et al. ............. 330/307 |
| 7,509,100 | B2* | 3/2009 | Toncich ......................... 455/107 |
| 2004/0242289 | A1 | 12/2004 | Jellicoe et al. |
| 2007/0135062 | A1 | 6/2007 | Hwang et al. |

FOREIGN PATENT DOCUMENTS

| CN | 1954489 A | 4/2007 |
| CN | 101502004 A | 8/2009 |
| CN | 101505168 A | 8/2009 |
| CN | 101814927 A | 8/2010 |
| WO | 9962193 A | 12/1999 |

OTHER PUBLICATIONS

International Search Report for PCT/CN2010/078916 dated Feb. 24, 2011.

* cited by examiner

Primary Examiner — Christian Hannon
(74) Attorney, Agent, or Firm — Banner & Witcoff, Ltd.

(57) ABSTRACT

The present invention discloses a multi-mode full frequency band radio frequency transmission device comprising a radio frequency switch chip positioned in the latter stage of the radio frequency main amplifier chip and configured to integrate all solid switch elements. Each of the solid switch elements comprises a transfer switch used when values of a variable capacitor and a variable inductor are controlled. The variable capacitor and the variable inductor are configured to control values of passive elements in an input switch matching circuit/output switch matching circuit to implement a single input/output matching circuit. The present invention further discloses a multi-mode full frequency band radio frequency transmission method comprising controlling values of passive elements in an input switch matching circuit/output switch matching circuit through the variable capacitor and the variable inductor to implement a single input/output matching circuit.

5 Claims, 4 Drawing Sheets

RADIO FREQUENCY TRANSMISSION DEVICE AND METHOD WITH MULTI-MODE AND FULL FREQUENCY BAND

TECHNICAL FIELD

The present invention relates to the radio frequency transmission technology, and in particular, to a multi-mode full frequency band radio frequency transmission device and method.

BACKGROUND OF THE RELATED ART

The radio frequency transmission technology is applied to a radio frequency front-end system of a mobile terminal. The structure of the radio frequency front-end system of the mobile terminal will be described as follows.

As the 3G technology has basically matured at present, domestic operators are mainly popularizing 3G mobile terminal products with a variety of standards. Mobile communication systems with the Time Division Synchronous Code Division Multiple Access (TD-SCDMA) standard are operated by the largest domestic mobile operator, China Mobile. At present, China Mobile is making efforts to popularize the next generation mobile standard of TD-SCDMA, TDD-LTE. Therefore, it can be predicted that coexistence of three standards, GSM, TD-SCDMA and LTE, in the same mobile terminal is required in mobile terminal products for a future long period of time, that is, the design for radio frequency front-end systems of mobile terminals in the future is required to meet the requirement of the coexistence of multiple mode standards.

In a common mobile terminal such as a mobile phone, there is typically a power amplifier (PA), which is a core part in a hardware circuit of a radio frequency front-end system. The PA is responsible for amplifying a final radio frequency modulated signal to a large enough power to facilitate antenna emission at the back-end. The basic radio frequency link structure of the entire radio frequency front-end system of a mobile phone is as shown in FIG. 1. The mobile phone in FIG. 1 supports the GSM or TDD standard.

All PA products in the market are of single standards presently. If the mobile phone is required to support multiple mode standards, a plurality of PAs which support different types of standards respectively must be used. A block diagram of an example of a radio frequency front-end system of a TD and GSM dual-mode mobile phone is shown in FIG. 2.

In summary, if a mobile terminal meeting the requirement of the coexistence of multiple mode standards, such as a mobile terminal compatible with GSM, TD and LTE, is required to be designed in the future, according to the existing design idea of the single standard described above, at least three discrete PA modules will be used for the multiple standards, so as to support their respective standards. This will undoubtedly increase design difficulty and production cost of the entire RF front-end system. Therefore, in order to avoid increase in design complexity and production cost of the entire radio frequency front-end system due to the design complexity of the PA, an equipment manufacturer which designs such a radio frequency front-end system further needs to make the integration design requirement to be the future design trend on the basis of the compatibility of the coexisting multiple mode standards, that is, both the compatibility requirement of the coexisting multiple mode standards and the integration design requirement can be satisfied.

A radio frequency transmission device in an existing radio frequency front-end system of a mobile terminal is used as a core device of the radio frequency front-end system, a PA module inside which will be described as follows.

The existing GSM PA generally uses Multi-chip Module (MCM) packaging. The PA module is composed of a printed circuit board (PCB), a main amplifier chip, a control chip and a plurality of passive matching elements, as shown in FIG. 3.

Since the GSM standard is divided into two frequency bands, in the prior art, main amplifier chips can be manufactured altogether, but output matching circuits are still fabricated in branches of different frequency bands. In addition, SMDs (surface mounted devices) are required in the matching elements. If various frequency bands, such as TD and LTE, are required to be integrated into the PA module in the future, then one output matching circuit is required to be fabricated for each frequency band according to the above existing design idea that output matching circuits are fabricated in branches of different frequency bands, thus multi-branch input/output matching circuits will result in increase in the design complexity of the PA module. The internal structure of the existing multi-mode PA is as shown in FIG. 4. Moreover, the increase in the design complexity of the PA module will inevitably result in increase in the complexity of routing of internal circuits of the radio frequency transmission device, and accordingly the complexity of external pins of the radio frequency transmission device will increase.

In summary, because using the prior art, neither the compatibility requirement of the coexisting multiple mode standards nor the integration design requirement can be satisfied well, the system design complexity and production cost can not be decreased fundamentally. Therefore, there is an urgent need for a new radio frequency transmission device to better meet this requirement, so as to decrease the system design complexity and production cost radically.

SUMMARY OF THE INVENTION

In view of this, a main object of the present invention is to provide a multi-mode full frequency band radio frequency transmission device and method so as to decrease the system design complexity and production cost radically.

In order to achieve the aforementioned object, a technical scheme of the present invention is implemented as follows.

The present invention provides a multi-mode full frequency band radio frequency transmission device comprising a radio frequency main amplifier chip and a control chip inside the device. The device further comprises a radio frequency switch chip positioned in the latter stage of the radio frequency main amplifier chip and configured to integrate all solid switch elements. Each of the solid switch elements comprises a transfer switch used when values of a variable capacitor and a variable inductor are controlled.

The variable capacitor and the variable inductor are configured to control values of passive elements in an input switch matching circuit/output switch matching circuit to implement a single input/output matching circuit.

The variable capacitor is configured to meet requirements of input/output matching for different frequency bands, and the required capacitance value decreases as the frequency increases.

The variable inductor is configured to meet requirements of input/output matching for different frequency bands, and the required inductance value decreases as the frequency increases.

The device further comprises pins external to the device, and the structure of the pins is adapted to the internal structure of the device. The pins include the following pin types:

pin type 1: pin of a unified input of radio frequency signals;

pin type 2: pin of a power supply of the radio frequency transmission device;

pin type 3: pin for switching between a transmitting mode and a receiving mode;

pin type 4: pin of an analog power control input;

pin type 5: pin composing logic control bits in a selected radio frequency band;

pin type 6: pin of a receiving end of radio frequency signals;

pin type 7: pin of a common port;

pin type 8: pin of a radio frequency connecting antenna port.

In the cases that the pin type 1 is identified by Rfin, the pin type 2 is identified by Vbatt, the pin type 3 is identified by TX/RX, the pin type 4 is identified by Vr, the pin type 5 is identified by BS1, BS2, BS3 and BS 4, the pin type 6 is identified by RX1, RX2, RX3, RX4, RX5 and RX6, the pin type 7 is identified by GND, and the pin type 8 is identified by ANT, the Rfin, Vbatt, TX/RX, Vr, BS1, BS2, BS3 and BS 4 pins are located at one side of the device, and are all used as pins at an input side of the device; the RX1, RX2, RX3, RX4, RX5 and RX6, GND and ANT pins are located at the other side of the device, and are all used as pins at an output side of the device; wherein the Rfin pin is connected to the input switch matching circuit; and the input switch matching circuit is connected to the radio frequency switch chip via the radio frequency main amplifier chip and the output switch matching circuit;

the Vr, BS1, BS2 and BS3 pins are respectively connected to the control chip; and the control chip is connected to the radio frequency main amplifier chip and also to the radio frequency switch chip; and the RX1, RX2, RX3, RX4, RX5 and RX6, and ANT pins are respectively connected to the radio frequency switch chip.

The present invention provides a multi-mode full frequency band radio frequency transmission method comprising:

integrating all solid switch elements through a radio frequency switch chip inside a multi-mode full frequency band radio frequency transmission device, wherein each of the solid switch elements comprises a transfer switch used when values of a variable capacitor and a variable inductor are controlled; and controlling values of passive elements in an input switch matching circuit/output switch matching circuit through the variable capacitor and the variable inductor, to implement a single input/output matching circuit.

The method further comprises: using the variable capacitor to meet requirements of input/output matching for different frequency bands, and wherein the required capacitance value decreases as the frequency increases; and using the variable inductor to meet requirements of input/output matching for different frequency bands, and wherein the required inductance value decreases as the frequency increases.

The method further comprises providing pins external to the device which are adapted to the internal structure of the device. The pins include the following pin types:

pin type 1: pin of a unified input of radio frequency signals;

pin type 2: pin of a power supply of the radio frequency transmission device;

pin type 3: pin for switching between a transmitting mode and a receiving mode;

pin type 4: pin of an analog power control input;

pin type 5: pin composing logic control bits in a selected radio frequency band;

pin type 6: pin of a receiving end of radio frequency signals;

pin type 7: pin of a common port;

pin type 8: pin of a radio frequency connecting antenna port.

In the present invention, all solid switch elements are integrated through a radio frequency switch chip, where each of the solid switch element comprises a transfer switch used when values of a variable capacitor and a variable inductor are controlled; values of passive elements in an input switch matching circuit/output switch matching circuit are controlled through the variable capacitor and the variable inductor to implement a single input/output matching circuit.

The multi-mode full frequency band radio frequency transmission device in accordance with the present invention is mainly applied to the design of a radio frequency front-end system of a mobile terminal with the future multi-mode standard to meets well both the compatibility requirement of the coexisting multiple mode standards and the integration design requirement. The implemented single input/output matching circuit is different from multiple input/output matching circuits implemented in the prior art, thus decreasing the system design complexity and production cost radically.

PREFERRED EMBODIMENTS OF THE PRESENT INVENTION

The basic idea of the present invention is that all solid switch elements are integrated through a radio frequency switch chip, where each of the solid switch element comprises a transfer switch used when values of a variable capacitor and a variable inductor are controlled; values of passive elements in an input switch matching circuit/output switch matching circuit are controlled through the variable capacitor and the variable inductor to implement a single input/output matching circuit.

The implementation of the technical scheme will be further described in detail in conjunction with the accompanying drawings.

The design idea of the present invention is mainly that inside the radio frequency transmission device, the low temperature ceramic co-firing technology (LTCC) is used to implement an input/output matching circuit, which is different from the prior art in which SMDs (surface mount devices)

are used. In addition, both capacitive elements and inductive elements are adjustable elements for the input/output matching circuit, so as to control values of passive elements in the input/output switch matching circuit to meet requirements of input and output matching for different frequency bands such that the original multiple input/output matching circuits in the prior art can be transformed into a single input/output matching circuit by introducing the control of the variable capacitors and variable inductors, that is, the system design complexity and production cost are decreased on the basis of guarantee of the compatibility. Taking into account the integration, the design complexity and production cost are further decreased by integrating solid switch elements, including transfer switches which controls the capacitive elements and inductive elements, into a radio frequency switch chip. Compared with the prior art, the present invention further implements the design of pins outside the radio frequency transmission device, which corresponds to the simplified internal design of the radio frequency transmission device, to adapt to the internal design of the radio frequency transmission device, which will be described specifically hereinafter.

A multi-mode full frequency band radio frequency transmission device mainly comprises the following contents.

1. A variable capacitor and variable inductor will be described respectively hereinafter.

Figure 1:
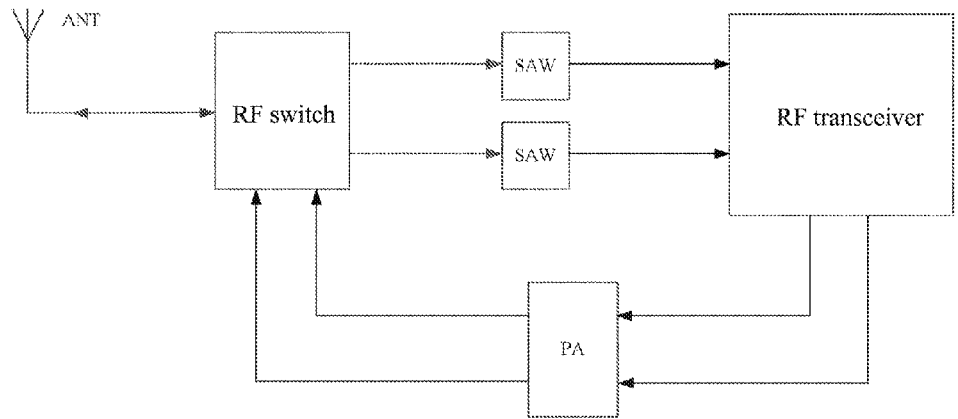
FIG. 1 is a structural diagram of a basic radio frequency link of a radio frequency front-end system of a existing mobile phone.
Figure 2:
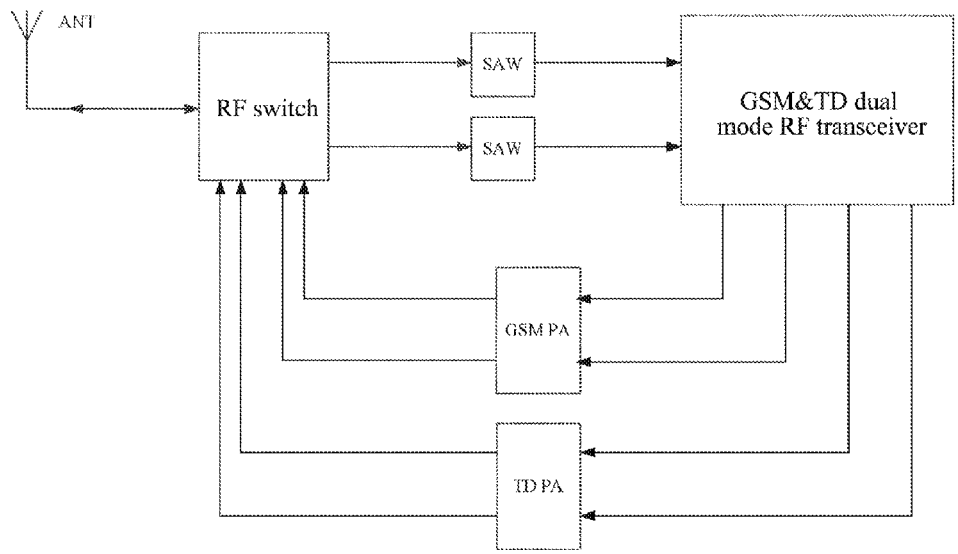
FIG. 2 is a structural diagram of a radio frequency front-end system of an existing TD and GSM dual-mode mobile phone.
Figure 3:
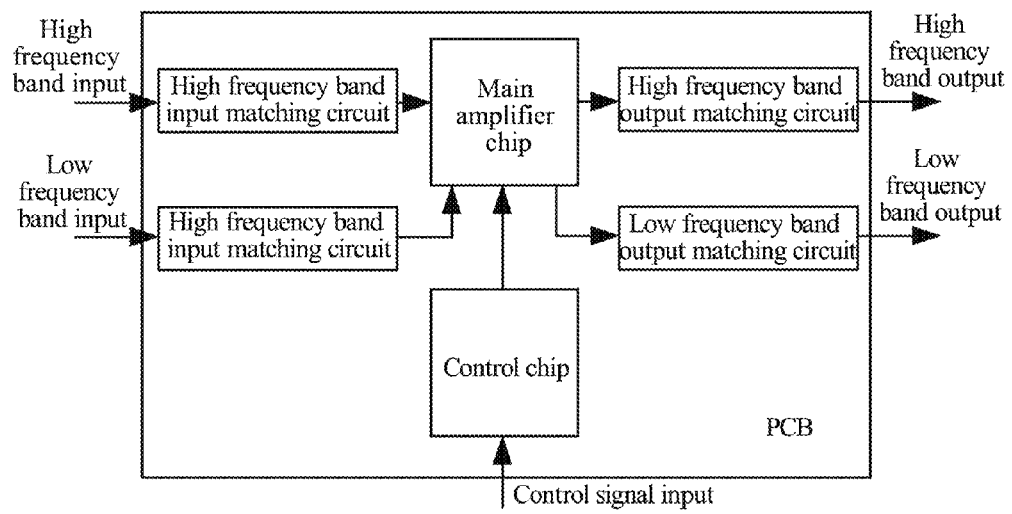
FIG. 3 is a diagram of the internal structure of an existing GSM PA.
Figure 4:
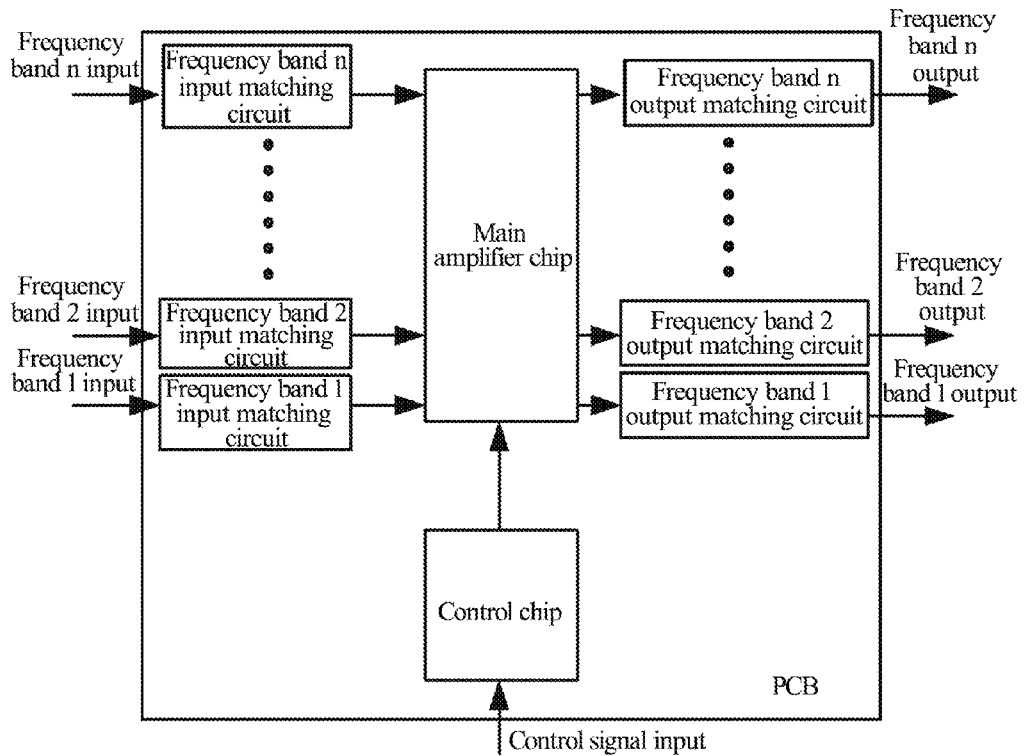
FIG. 4 is a diagram of the internal structure of an existing multi-mode PA.
Figure 5:
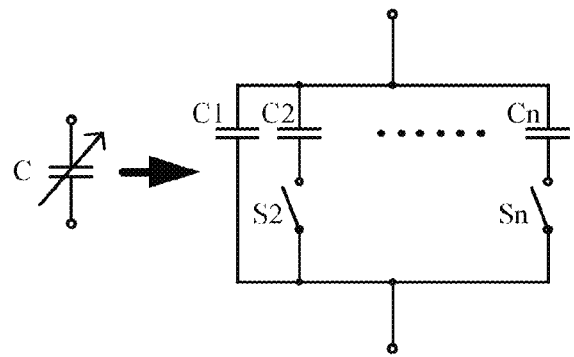
FIG. 5 is a schematic diagram of a variable capacitor in accordance with the present invention.

1) For the variable capacitor, the required capacitance value decreases as the frequency increases when an input/output matching circuit is designed. When the order of frequency bands according to the frequency from low to high is frequency band 1, frequency band 2 ... frequency band n−1, and frequency band n, accordingly, C1 is selected as the capacitance in frequency band n, C1+C2 is the capacitance in frequency band n−1, and so on, C1+C2+ ... Cn−1+Cn is the capacitance in frequency band 1. The structure of the variable capacitor is as shown in FIG. 5.

Figure 6:
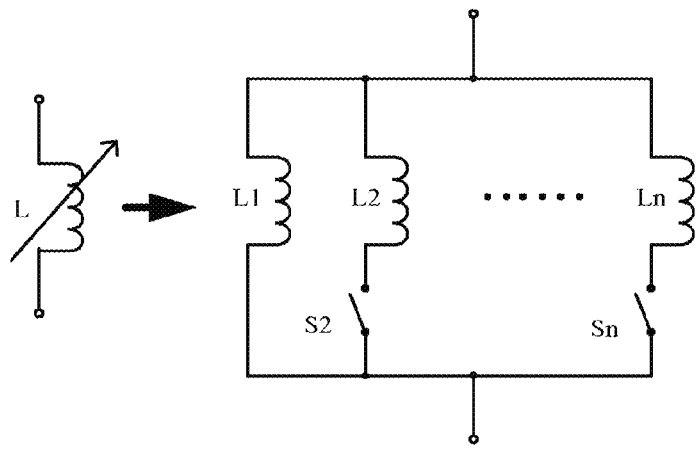
FIG. 6 is a schematic diagram of a variable inductor in accordance with the present invention.

2) For the variable inductor, the required inductance value decreases as the frequency increases when an input/output matching circuit is designed. When the order of frequency bands according to the frequency from low to high is frequency band 1, frequency band 2 ... frequency band n−1, and frequency band n, accordingly, L1 is selected as the inductance in frequency band n, L1+L2 is the inductance in frequency band n−1, and so on, L1+L2+ ... Ln−1+Ln is the inductance in frequency band 1. The structure of the variable capacitor is as shown in FIG. 6.

2. All solid switch elements are integrated into a radio frequency switch chip, which will be described specifically hereinafter.

Figure 7:
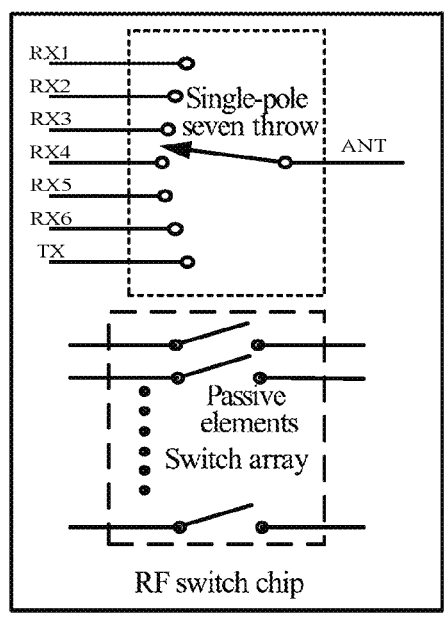
FIG. 7 is a diagram of the internal structure of a radio switch chip in accordance with the present invention.
Figure 8:
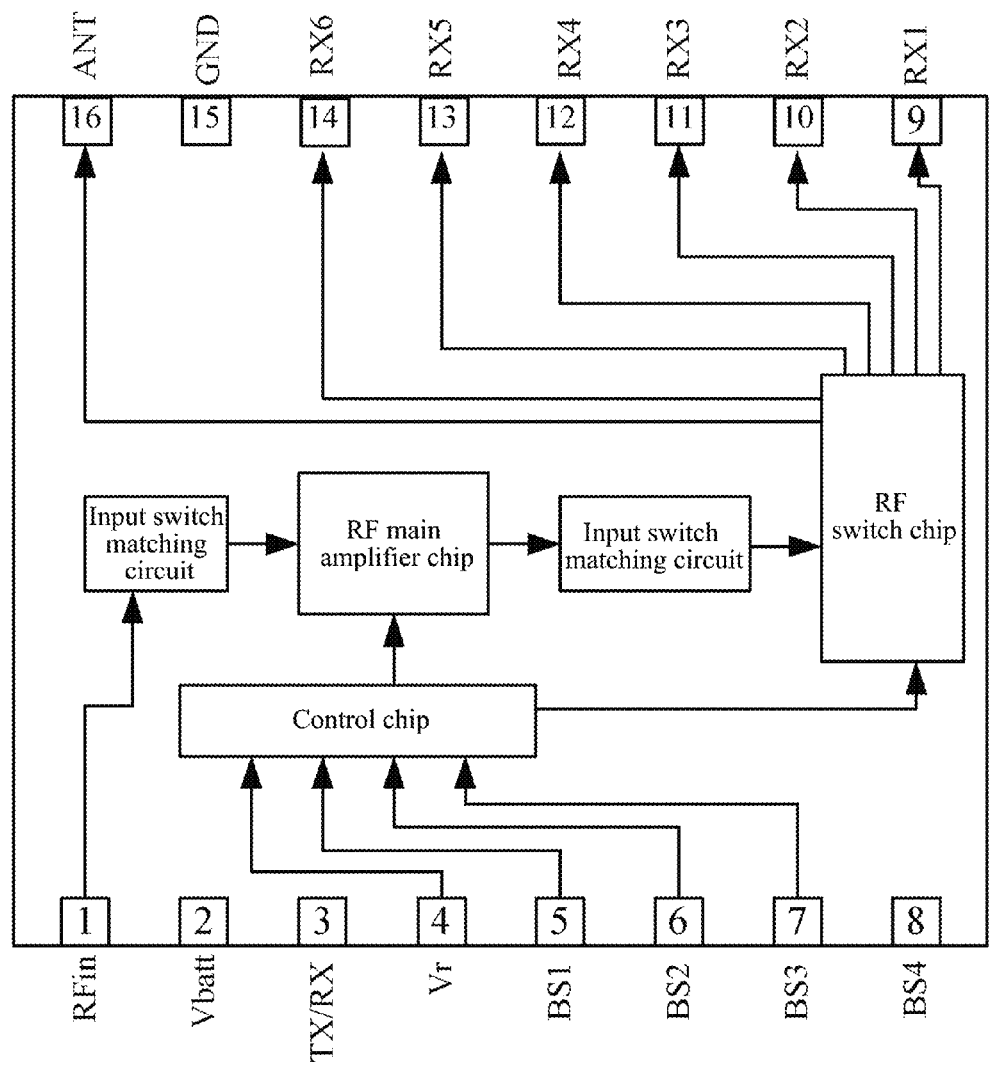
FIG. 8 is a schematic diagram of the internal structure of a radio frequency transmission device and external pins in accordance with the present invention.

Radio frequency switch elements outside the PA, i.e., the solid switch elements, are integrated into the radio frequency transmission device. Specifically, inside the radio frequency transmission device, a single-pole seven throw switch in a radio frequency path as well as a transfer switch used when values of the variable capacitor and the variable inductor are controlled are fabricated on one chip, which is the radio frequency switch chip in FIG. 8. FIG. 8 shows a diagram of the internal structure of the radio frequency transmission device and external pins; and FIG. 7 shows a schematic diagram of the internal structure of the switch in the radio switch chip. It should be noted that the variable capacitor and variable inductor implement adjustment and control of the values through a series of transfer switches which are integrated into the radio frequency switch chip, that is, the transfer switch controlling the variable capacitor and variable inductor is located in the radio frequency switch chip while other portions of the variable capacitor and variable inductor are located outside the radio frequency switch chip, as shown in FIG. 7.

3. The entire radio frequency transmission device will be described specifically hereinafter.

The entire radio frequency transmission device, which uses the LTCC as a printed circuit board, comprises only three chips, a control chip, a radio frequency main amplifier chip and a radio frequency switch chip, respectively. The schematic diagram of the design of the internal structure of the entire radio frequency transmission device integrating n frequency bands and external pin design is as shown in FIG. 8. The pins can also be referred to as input and output terminal pins.

The pins include a plurality of pin types, function of each of which is described as follows.

RFin pin: a unified input of radio frequency signals;

Vbatt pin: a power supply of the radio frequency transmission device;

TX/RX pin: switching between a transmitting mode and a receiving mode;

Vr pin: an analog power control input, which is used as an analog control end of the output power when in the GSM mode, and is used as a switching control end for high and low power positions when in TD and LTE modes;

BS1, BS2, BS3 and BS4 pins: composing logic control bits in a selected radio frequency band;

RX1, RX2, RX3, RX4, RX5 and RX6 pins: a receiving end of radio frequency signals;

GND pin: a common end representing a ground or zero line;

ANT pin: a radio frequency connecting antenna port, which is then connected to the antenna directly.

Here, it should be noted that the pin types described above are all Must options.

In summary, it can be seen that as shown in FIG. 8, the multi-mode full frequency band radio frequency transmission device in accordance with the present invention reasonably uses the radio frequency switch chip in the latter stage of the radio frequency main amplifier chip as a carrier of the solid switches, and effectively controls the variable capacitor and variable inductor through the transfer switch in the radio frequency switch chip to implement control of values of passive elements in the matching circuit so as to meet requirements of input and output matching for different frequency bands. At the same time the design of the pins external to the radio frequency transmission device, which corresponds to the design of the internal structure of the radio frequency transmission device, is also proposed such that both the internal design and the external design of the radio frequency transmission device can be simplified au maximum. Using the present invention, the design complexity and production cost of a radio frequency front-end system of a future multi-mode mobile terminal will be decreased greatly to facilitate popularity of compatibility and integration of a higher standard mobile terminal in the future. The solid switch elements are all the switch elements in the radio frequency switch chip as shown in FIG. 7, including the transfer switch used when values of a variable capacitor and a variable inductor are controlled.

A multi-mode full frequency band radio frequency transmission method mainly comprises the following contents.

1. All solid switch elements are integrated through a radio frequency switch chip inside a multi-mode full frequency band radio frequency transmission device, wherein each of the solid switch element comprises a transfer switch used when values of a variable capacitor and a variable inductor are controlled.

2. Values of passive elements in an input switch matching circuit/output switch matching circuit are controlled through the variable capacitor and the variable inductor to implement a single input/output matching circuit.

Here, the method further comprises: using the variable capacitor to meet requirements of input/output matching for different frequency bands, and wherein the required capacitance value decreases as the frequency increases; and using the variable inductor to meet requirements of input/output matching for different frequency bands, and wherein the required inductance value decreases as the frequency increases.

Here, the method further comprises providing pins external to the device which are adapted to the internal structure of the device. The pins include the following pin types:

pin type 1: pin of a unified input of radio frequency signals;
pin type 2: pin of a power supply of the radio frequency transmission device;
pin type 3: pin for switching between a transmitting mode and a receiving mode;
pin type 4: pin of an analog power control input;
pin type 5: pin composing logic control bits in a selected radio frequency band;
pin type 6: pin of a receiving end of radio frequency signals;
pin type 7: pin of a common port;
pin type 8: pin of a radio frequency connecting antenna port.

Here, it should be noted that the aforementioned pin types are all Must options.

The English words involved in the accompanying drawings will be described here: ANT represents an antenna; a radio frequency switch can be represented as RF switch; SAW represents a surface acoustic wave filter; a radio frequency transceiver can be represented as RF transceiver; a GSM and TD dual-mode radio frequency transceiver can be represented as GSM&TD dual mode RF transceiver.

The above description is only the preferred embodiments of the present invention, and is not intended to limit the protection scope of the present invention.

What is claimed is:

1. A multi-mode full frequency band radio frequency transmission device comprising a radio frequency main amplifier chip and a control chip inside the device, wherein the device further comprises a radio frequency switch chip positioned in the latter stage of the radio frequency main amplifier chip and configured to integrate all solid switch elements, each of the solid switch elements comprises a transfer switch used when values of a variable capacitor and a variable inductor are controlled; and the variable capacitor and the variable inductor are configured to control values of passive elements in an input switch matching circuit/output switch matching circuit to implement a single input/output matching circuit;

wherein the device further comprises pins external to the device, and the structure of the pins is adapted to the internal structure of the device; and the pins include the following pin types:

pin type 1: pin of a unified input of radio frequency signals;
pin type 2: pin of a power supply of the radio frequency transmission device;
pin type 3: pin for switching between a transmitting mode and a receiving mode;
pin type 4: pin of an analog power control input;
pin type 5: pin composing logic control bits in a selected radio frequency band;
pin type 6: pin of a receiving end of radio frequency signals;
pin type 7: pin of a common port;
pin type 8: pin of a radio frequency connecting antenna port.

2. The device according to claim 1, wherein the variable capacitor is configured to meet requirements of input/output matching for different frequency bands, and the required capacitance value decreases as the frequency increases; and the variable inductor is configured to meet requirements of input/output matching for different frequency bands, and the required inductance value decreases as the frequency increases.

3. The device according to claim 1, wherein in the cases that the pin type 1 is identified by Rfin, the pin type 2 is identified by Vbatt, the pin type 3 is identified by TX/RX, the pin type 4 is identified by Vr, the pin type 5 is identified by BS1, BS2, BS3 and BS 4, the pin type 6 is identified by RX1, RX2, RX3, RX4, RX5 and RX6, the pin type 7 is identified by GND, and the pin type 8 is identified by ANT, the Rfin, Vbatt, TX/RX, Vr, BS1, BS2, BS3 and BS 4 pins are located at one side of the device, and are all used as pins at an input side of the device; the RX1, RX2, RX3, RX4, RX5 and RX6, GND and ANT pins are located at the other side of the device, and are all used as pins at an output side of the device; wherein the Rfin pin is connected to the input switch matching circuit; and the input switch matching circuit is connected to the radio frequency switch chip via the radio frequency main amplifier chip and the output switch matching circuit;

the Vr, BS1, BS2 and BS3 pins are respectively connected to the control chip; and the control chip is connected to the radio frequency main amplifier chip and also to the radio frequency switch chip; and the RX1, RX2, RX3, RX4, RX5 and RX6, and ANT pins are respectively connected to the radio frequency switch chip.

4. A multi-mode full frequency band radio frequency transmission method comprising:

integrating all solid switch elements through a radio frequency switch chip inside a multi-mode full frequency band radio frequency transmission device, wherein each of the solid switch elements comprises a transfer switch used when values of a variable capacitor and a variable inductor are controlled; and controlling values of passive elements in an input switch matching circuit/output switch matching circuit through the variable capacitor and the variable inductor, to implement a single input/output matching circuit;

wherein the method further comprises providing pins external to the device which are adapted to the internal structure of the device wherein the sins include the following pin types:

pin type 1: pin of a unified input of radio frequency signals;
pin type 2: pin of a power supply of the radio frequency transmission device;
pin type 3: pin for switching between a transmitting mode and a receiving mode;
pin type 4: pin of an analog power control input;
pin type 5: pin composing logic control bits in a selected radio frequency band;
pin type 6: pin of a receiving end of radio frequency signals;

pin type 7: pin of a common port;
pin type 8: pin of a radio frequency connecting antenna port.

5. The method according to claim 4, further comprising:
using the variable capacitor to meet requirements of input/output matching for different frequency bands, wherein the required capacitance value decreases as the frequency increases; and
  using the variable inductor to meet requirements of input/output matching for different frequency bands, wherein the required inductance value decreases as the frequency increases.

* * * * *